UNITED STATES PATENT OFFICE.

LOUIS ENRICHT, OF CHICAGO, ILLINOIS, ASSIGNOR TO THE UNITED STATES DUROLITHIC COMPANY, OF WEST UNION, IOWA.

MANUFACTURE OF CEMENT.

SPECIFICATION forming part of Letters Patent No. 486,450, dated November 22, 1892.

Application filed January 4, 1892. Serial No. 416,986. (No specimens.)

*To all whom it may concern:*

Be it known that I, LOUIS ENRICHT, a citizen of the United States, residing at Chicago, in the county of Cook and State of Illinois, have invented a certain new and useful Improvement in the Manufacture of Cement, (Case No. 7,) of which the following is a full, clear, concise, and exact description.

My invention relates to a process and a composition of matter for the manufacture of cement or paint with magnesium as a basis.

In previous patents and applications for patents I have described a process and composition of matter which I use in the manufacture of artificial stone and cement in which sand or some inert substance is an essential ingredient.

In the process and composition of matter of this invention no inert substance is required, the process and composition of matter being intended for the purpose of producing a binding material which may be used for the purpose of coating other substances and may be applied with a brush.

The process which I prefer to practice in making the product of this invention is as follows: I dissolve egg-albumen in water in the proportion of four ounces of the former to twenty ounces of the latter. For the purpose of preventing the coagulation of the egg-albumen I acidify it with dilute hydrochloric acid by the process of osmose, by which means the egg-albumen is not coagulated and is rendered non-coagulable. The process of osmose consists of putting a solution of egg-albumen in a parchment vessel, which is suspended in another vessel containing dilute hydrochloric acid, and leaving it there for the period of forty-eight to sixty hours, after which the egg-albumen is removed, leaving the hydrochloric acid in the outer vessel ready to acidify another batch of egg-albumen. This acidified egg-albumen I add to a solution of magnesium chloride of at least 20° Baumé. The proportion of the acidified egg-albumen to the solution of magnesium chloride may be varied within wide limits. I preferably use from one to ten per cent. of the acidified egg-albumen to from ninety-nine to ninety per cent. of the solution of magnesium chloride. The resulting mass is a liquid, which will remain liquid for any desired length of time.

The addition of magnesium oxide to the mixture of magnesium chloride and acidified egg-albumen in the proportion of, say, fifty pounds of the former to three gallons of the latter, results in a plastic mass, which may be applied to the surfaces of wood, brick, or other material by a brush.

The addition of the magnesium oxide to the solution of magnesium chloride and non-coagulable albumen causes the resulting compound to harden. In my process, therefore, I first prepare the solution of magnesium chloride and non-coagulable albumen, which will persist in liquid form, and add to the said solution magnesium oxide when it is desired to have the paint or cement set.

The exact proportions above indicated are not an essential feature of my invention, and may be departed from within considerable limits without serious injury to the resulting product. Ocher or other suitable coloring-pigment may be added to the magnesium oxide to give the resulting mass any color that may be desired. When the composition consisting of the magnesium chloride and acid egg-albumen, magnesium oxide, and coloring-pigment are thoroughly mixed and allowed to stand, the resulting mass becomes crystalized and hardened, forming a compact mass practically impervious to moisture and not readily attacked by atmospheric or climatic influences. While the above-described material is in a plastic state an inert substance may be added to it, if desired, the plastic material itself becoming the binding connection, which will harden and cause the entire mass to become a solid compact artificial stone.

It is obvious that an important result from the process and composition of matter described herein is that the solution of acid albumen and magnesium chloride may be carried in suitable receptacles to any desired point. The magnesium oxide in the form of powder, with the coloring-pigment, may also be transported and the solution and the powder mixed together wherever desired. The resulting product may thus be sold as a commercial article. The coating of the product resulting from the process and composition of matter of my invention, when applied to any material, has great preservative qualities.

Having thus described my invention, what I claim as new, and desire to secure by Letters Patent, is—

1. The process of making cement, which consists in mixing together non-coagulable albumen and a solution of magnesium chloride and subsequently adding to the liquid mixture thus formed magnesium oxide, whereby a non-hygroscopic cement or paint is produced, substantially as described.

2. The herein-described composition of matter for the production of a paint or cement, consisting of magnesium chloride and non-coagulable egg-albumen and magnesium oxide, in proportions substantially as specified.

3. The herein-described composition of matter for the production of cement or paint, consisting of magnesium chloride and non-coagulable albumen, magnesium oxide, and a coloring pigment, substantially in the proportions specified.

In witness whereof I hereunto subscribe my name this 2d day of January, A. D. 1892.

LOUIS ENRICHT.

Witnesses:
CHARLES A. BROWN,
GEORGE L. CRAGG.